United States Patent [19]

Peissel et al.

[11] 4,111,277
[45] Sep. 5, 1978

[54] GAS CUSHION VEHICLE

[76] Inventors: Michel Francois Peissel, Calle del Puig, Cadaques (Gerona), Spain; Robert Longley Trillo, Broadlands, Brockenhurst, Hampshire, England

[21] Appl. No.: 771,510

[22] Filed: Feb. 24, 1977

Related U.S. Application Data

[63] Continuation of Ser. No. 579,175, May 20, 1975, abandoned.

[30] Foreign Application Priority Data

May 20, 1974 [GB] United Kingdom ............... 22426/74

[51] Int. Cl.² .............................................. B60V 1/06
[52] U.S. Cl. ..................................... 180/122; 180/127
[58] Field of Search ................................. 180/116-130

[56] References Cited

U.S. PATENT DOCUMENTS

| 3,090,455 | 5/1963 | Crowley | 180/117 |
| 3,246,712 | 4/1966 | Mackie | 180/119 |
| 3,276,530 | 10/1966 | Borneman | 180/124 |
| 3,379,271 | 4/1968 | Hopkins | 180/128 |
| 3,398,809 | 8/1968 | Wood | 180/120 X |
| 3,429,395 | 2/1969 | Beardsley | 180/124 X |
| 3,561,558 | 2/1971 | Parkhouse | 180/120 |
| 3,563,333 | 2/1971 | Beardsley | 180/124 X |
| 3,587,771 | 6/1971 | Faure | 180/120 |
| 3,608,663 | 9/1971 | Ferguson | 180/120 |
| 3,746,116 | 7/1973 | Schwingshandl | 180/121 |
| 3,811,527 | 5/1974 | Pont | 180/121 |
| 3,827,527 | 8/1974 | Bertelsen | 180/120 |
| 3,841,433 | 10/1974 | Dyke | 180/116 |
| 3,869,020 | 3/1975 | Holland | 180/120 |
| 3,870,121 | 3/1975 | Schneider | 180/117 |

FOREIGN PATENT DOCUMENTS 1,212,380 11/1970 United Kingdom ............... 180/117

Primary Examiner—John P. Silverstrim
Attorney, Agent, or Firm—John J. Byrne

[57] ABSTRACT

A gas cushion vehicle having a portable fan unit with control apparatus for utilizing the air flow generated by the fan for lifting, propulsion and/or inflating a peripheral skirt on the hull thereof such that skirt pressure is higher than cushion pressure and skirt pressure is relatively independent of fan speed.

6 Claims, 6 Drawing Figures

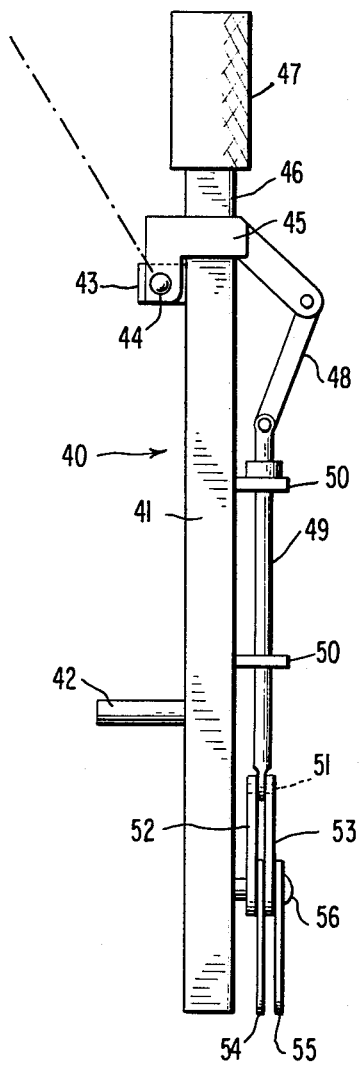
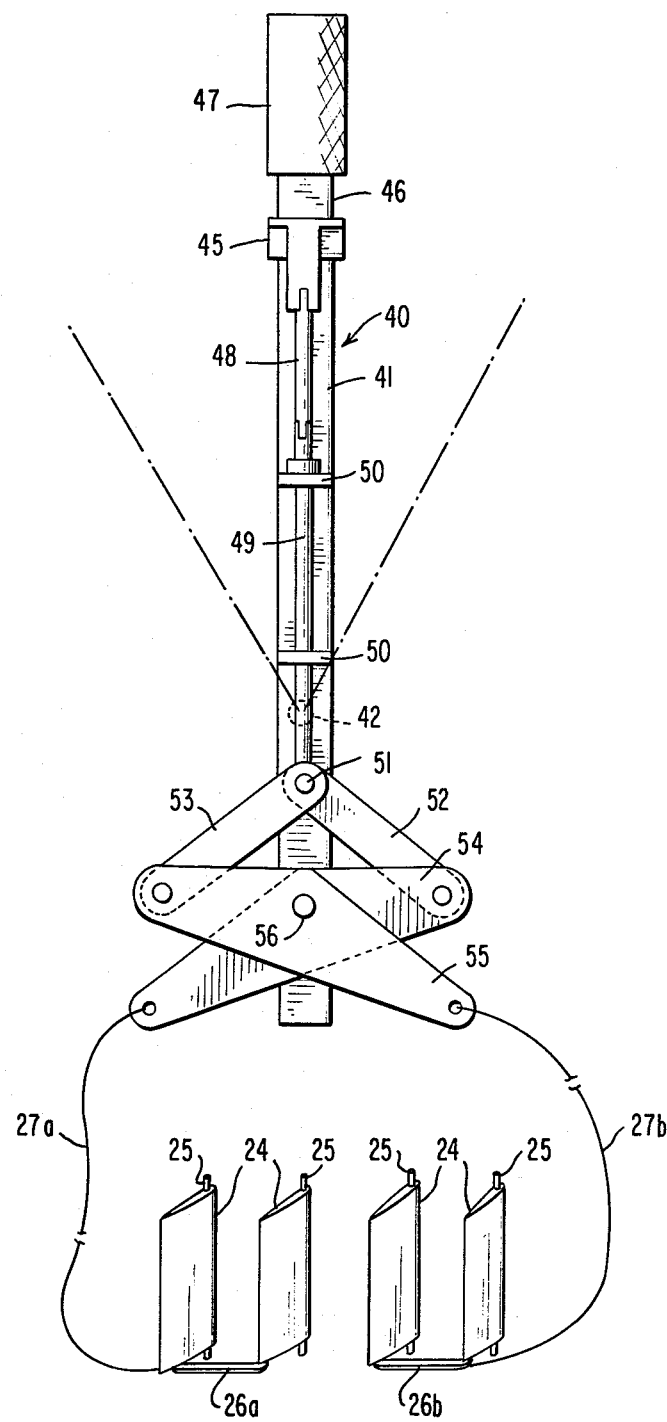
FIG.4
FIG.5

GAS CUSHION VEHICLE

This is a continuation of application Ser. No. 579,175, filed May 20, 1975, and abandoned upon the filing of this application.

This invention relates to a portable fan unit for propelling, lifting and controlling a gas-cushion vehicle and to a gas cushion vehicle provided with such a portable fan unit.

The term "portable fan unit" refers to a fan unit which is readily removed intact from a vehicle either for replacement by a similar unit or for servicing. The term "gas-cushion vehicle" is intended to include any type of vehicle which is raised and moved on a cushion of air provided in a plenum chamber beneath the vehicle. The plenum chamber may be confined at least in part by a flexible peripheral skirt.

A principal objective of the present invention is to provide a portable fan unit for propelling and lifting and controlling a gas-cushion vehicle. A base structure is provided having means for detachably fixing it to the framework of the gas-cushion vehicle. A fan duct supported from said base construction is equipped with a bladed rotor therein. An opening or openings in the base structure and means for ducting a part of the air flow from the fan duct through said opening or openings for pressurizing at least the plenum chamber of the vehicle are provided. Transmission means supported from the base structure connects the bladed rotor to a prime mover for rotating the rotor.

The opening or openings in the base structure comprise a first aperture for directing part of the air flow from the fan duct to the plenum chamber of the vehicle and a second structure for directing part of the air flow from the fan duct to an inflatable skirt provided on the vehicle. The prime mover preferably consists of a motor mounted on said base structure.

In the disclosed embodiment, the rear end of the fan duct is provided with a plurality of adjustable deflector vanes controlling the direction of one part of the flow from the fan duct or for preventing rearward flow of said other part of the air flow and means are provided for adjusting the angular position of said vanes. The base structure supports a seat structure and control means for controlling the prime mover.

The present invention provides a gas-cushioned vehicle provided with a portable fan unit for propelling and lifting the vehicle as defined above. The gas-cushion vehicle is comprised of an inflatable hull provided with a downwardly extending peripheral flexible skirt.

Another object of this invention is to provide a portable fan unit which is adaptable for use with various hull designs of gas-cushion vehicles.

These and other objects of the invention will become more apparent to those skilled in the art by reference to the following detailed description when viewed in light of the accompanying drawings wherein:

FIG. 4 is a side elevation of a control stick; and

FIG. 5 is a front elevation of the control stick and showing in perspective the deflector vanes which it controls.

Figure 1:
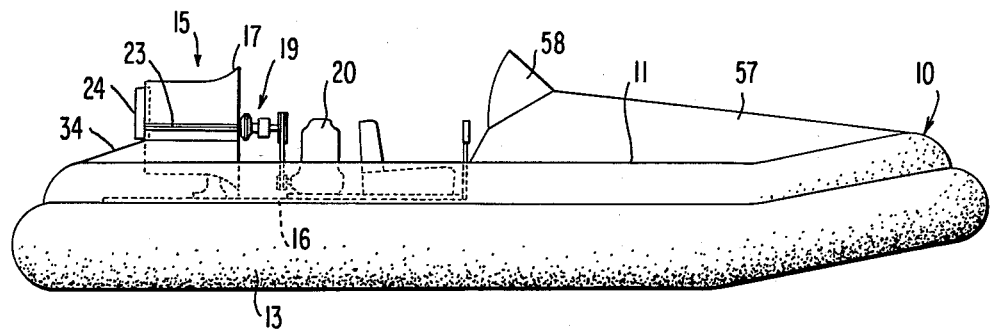
FIG. 1 is a diagrammatic side elevation view of a gas-cushion vehicle provided with a portable fan unit.
Figure 1A:
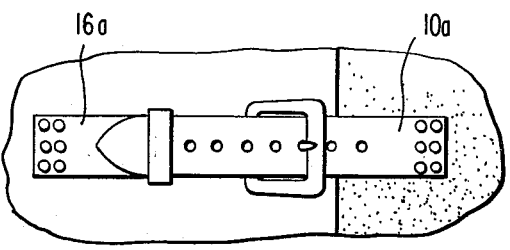
FIG. 1a is a closeup of the connection between the hull and base structure.
Figure 2:
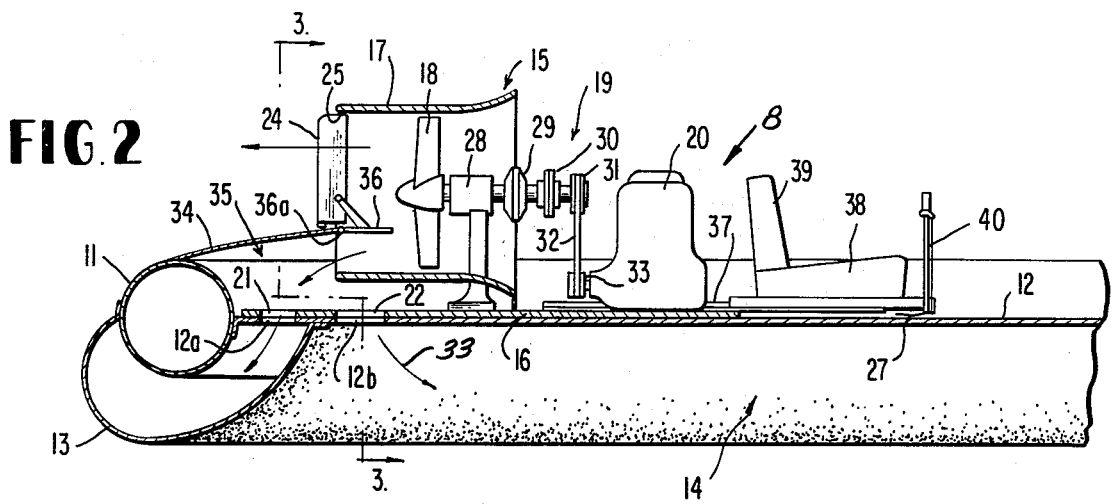
FIG. 2 is a longitudinal sectional view through part of the vehicle and the portable fan unit of FIG. 1.
Figure 3:
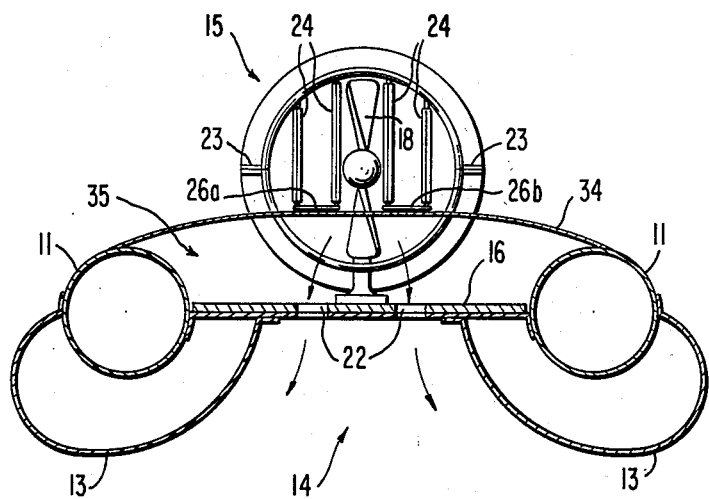
FIG. 3 is a transverse sectional view taken along the line 3—3 of FIG. 2.

Referring now to the drawings wherein like numerals indicate like parts, the numeral 8 refers generally to a gas-cushion vehicle having a hull 10 and an inflatable side body portion 11 having a flexible floor 12. Connected to the side body portion 11 and to the floor 12 is a peripheral, downwardly depending, flexible and inflatable skirt 13 defining beneath the hull 10, a plenum chamber 14.

A hull 10 is provided with a portable fan unit 15 which includes a base structure 16, a fan duct 17, a bladed rotor 18, a drive transmission 19 and an engine 20. The base structure 16 is in the form of a rigid planar member provided with straps 16a (not connected in FIG. 1) which serve to fix it securely to straps 10a provided on the hull 10. The fixing is such that the base structure 16 is readily disconnected and removed from hull 10. The base structure 16 is provided with an aperture 21 and apertures 22. When the base structure 16 is fixed in position on the hull, apertures 21 and 22 are aligned with apertures 12a and 12b respectively provided in flexible floor 12.

The fan duct 17 is affixed to the base structure 16 by a support frame structure. The axis of the fan duct 17 is parallel to the longitudinal length of base structure 16. The fan duct 17 is preferably plastic and formed of two semi-circular portions joined together above flanges 23. At the rear of the fan duct 17, four vanes 24 are respectively pivotable about their axes 25. The vanes 24 are connected in pairs by connecting members 26a and 26b connected to the rear end of the vanes 24. Each pair of vanes 24 is respectively connected to operating cables 27a and 27b.

A bladed rotor 18 is mounted in a support 28 and is connected to a drive transmission 19. The transmission includes a power coupling 29 (i.e. a centrifugal clutch), a flexible coupling 30 and a pulley 31 connected by a belt drive 32 to an output pulley 33 of the engine 20. Preferably the couplings 29 and 30 are on the drive shaft from the engine 20.

The fan unit 15 has a duct forming cover 34 attached to the fan duct 17 and connected by a zip-fastener to the side body portion 11 and forms a chamber 35 through which a part of the air flow from the fan duct 17 can flow to the apertures 21 and 22. The aperture 21 communicates with the interior of the skirt 13 and air flowing through the aperture 21 serves to inflate the skirt 13. The apertures 22 communicate with the plenum chamber 14 and air flowing through the apertures 22 pressurizes the plenum chamber 14 to form the air cushion for the vehicle. As shown by the arrow 33, the air is deflected toward the bow of the craft. The fan duct 17 is provided with a flap 36 which can be pivoted at 36a so as to adjust the proportion of the air flow into the chamber 35 relative to the air flow exiting through vanes 24.

The base structure 16 is provided with an inverted T-section member 37 along each side which extend fowardly of the structure 16. Mounted on members 37 is a seat structure 38 having a seat 39 adjustable fore and aft of the vehicle. Mounted on the seat structure 38 is a control stick 40 which is shown in greater detail in FIGS. 4 and 5.

The control stick 40 comprises a square section tube 41 provided with a spindle 42 extending at right angles thereto and which is mounted for rotation in the seat structure 38. At the upper end of the tube 41 there is provided a lug 43 and pivotably connected to the lug 43 by a pivot pin 44 is a lever member 45 having a cylindrical portion 46 to which is mounted a twist-grip 47 which controls the throttle of the engine 20 by means of a cable. The lever 45 is connected by a linkage 48 to a rod extending parallel to the tube 41 and which is supported in brackets 50 of tube 41. At its lower end, the rod 49 is connected by a hinge pin 51 to links 52 and 53. The link 52 is hinged to a lever 54 and the link 53 is hinged to a lever 55. The levers 54 and 55 are rotatable about a pin 56 of tube 41. The free ends of levers 54 and 55 are respectively connected to operating cables 27a and 27b of one of the pairs of vanes 24. When tube 41 is vertical, and the cylindrical portion 46 is moved rearwardly, lever 45 will move about the axis of the pivot 44, thus raising the rod 49 and the levers 54 and 55 will move in unison about the axis of the pin 56 to create a pulling force on the cables 27 to move the vanes 24 to a position in which they block the outlet from the fan casing 17. Thus, the fan will not produce a forward propelling thrust on the craft. When the cylindrical portion 46 is in line with the vertical tube 41 the vanes 24 will be located in a position in which the air flow from the fan duct 16 is directed rearwardly without deflection.

Movement of tube 41 about the axis of spindle 42 in one direction or the other will cause one lever 54, 55 to pull on its associated cable 27 and the other lever 54, 55 to push its associated cable 27 so that the pairs of vanes 24 will be deflected in unison about their pivot axes 25 to deflect the air flow from the fan duct 17 in one direction or the other to effect a directional control on the vehicle.

The front end of the craft is provided with a cover 57 which is attached to the side body portion 11 and this is provided with a wind screen 58. The low end of the hull 10 is upwardly curved resulting in the front portion of the skirt 13 being similarly curved and in order to prevent loss of air from the plenum chamber 14 the front portion of the skirt 13 is provided with a downwardly extending flexible skirt portion 59. This assists in preventing plough-in tendencies.

It should be understood that the portable fan unit 15, including the seat structure and controls, can be disconnected from the hull 10 and removed intact.

The portable fan unit 15 can be replaced by a similar unit or transferred to another similar hull 10.

The gas-cushion vehicle of the type described is a high speed amphibious craft having a high power-to-weight ratio. The base structure 16 and seat structure can form part of a floor of the vehicle, said floor being of variable stiffness along its length, i.e. stiffer at the stern end than at the bow end.

Due to the fact that the hull 10 has an inflated side body portion 11, it is possible to hover the craft without inflating the skirt 13, i.e. the side body portion 11 acting as a peripheral skirt.

It should be understood that fuel tanks and other equipment can be carried on the base structure 16 so as to be removable therewith. The fan unit 15 forms a removable power pack for the vehicle.

The portable fan unit provides a compact unit for powering, lifting and controlling a gas-cushion vehicle and, particularly for a small craft, leaves an appreciable high percentage of useful deck space available for crew and equipment.

By virtue of the particular air fed arrangements, control may be effected over the ratio of the skirt bag pressure to cushion pressure.

In a general manner, while there has been disclosed an effective and efficient embodiment of the invention, it should be well understood that the invention is not limited to such an embodiment, as there might be changes made in the arrangement, disposition, and form of the parts without departing from the principle of the present invention as comprehended within the scope of the accompanying claims.

We claim:
1. In an air cushion vehicle comprising
   (a) a deck;
   (b) a downwardly depending skirt about said deck defining a first plenum chamber, said skirt containing a second inflatable annular chamber; and
   (c) a fan unit housing containing a fan the axis of rotation of which is horizontal and having an air intake and an air exit end, said fan unit housing being mounted at the stern of the vehicle;
the improvement comprising:
   (d) a third chamber located about said deck;
   (e) means communicating said air exit end of said fan unit housing to said third chamber for pressurizing the same;
   (f) a first aperture through said deck communicating said third chamber to said first chamber, said first aperture being located forward of said air exit end of said fan unit housing, whereby air exiting from said fan unit housing has to reverse directions and is aimed towards the bow of the vehicle as it passes through said first aperture; and
   (g) a second aperture through said deck communicating said third chamber to said second chamber, said second aperture being located rearward of said air exit end of said fan unit housing, whereby air exiting from said housing does not have to reverse directions in order to enter said second chamber.

2. The vehicle of claim 1 and further comprising: adjustable closure means at said air exit end and means to adjust said closure means to selectively adjust the amount of air flowing to said third chamber.

3. The vehicle of claim 2 wherein a seat is mounted on said deck and said means to adjust are operable from the position of said seat.

4. The vehicle of claim 3 wherein a control handle is mounted adjacent said seat and said means to adjust are operable thereby.

5. The vehicle of claim 1 wherein means removably secures said fan unit to said deck.

6. The vehicle of claim 5 wherein said means to removably secure are inter-engaging members.

* * * * *